United States Patent [19]

Litteral et al.

[11] 4,269,992

[45] May 26, 1981

[54] PREPARATION OF HYDROLYZABLE POLYSILOXANE-POLYOXYALKYLENE BLOCK COPOLYMERS

[75] Inventors: Carl J. Litteral, Bethal, Conn.; David L. Mullins, Williamstown, W. Va.

[73] Assignee: Union Carbide Corporation, New York, N.Y.

[21] Appl. No.: 865,127

[22] Filed: Dec. 28, 1977

[51] Int. Cl.$^3$ .............................................. C07F 7/18
[52] U.S. Cl. ................................. 556/446; 525/474; 525/479; 528/12; 528/29; 521/112
[58] Field of Search ........... 260/824, 448.2 R, 46.5 R, 260/448.2 B; 528/11, 12, 29; 556/446

[56] References Cited

U.S. PATENT DOCUMENTS

| | | | |
|---|---|---|---|
| 3,036,035 | 5/1962 | Riley | 260/46.5 R |
| 3,271,360 | 9/1966 | Williams | 260/448.2 R |
| 3,555,063 | 1/1971 | Nakajima et al. | 260/824 R |

Primary Examiner—Wilbert J. Briggs, Sr.
Attorney, Agent, or Firm—Richard J. Gallagher

[57] ABSTRACT

Hydrolyzable polysiloxane-polyoxyalkylene block copolymers are provided by refluxing a reaction mixture containing: (a) a polydihydrocarbonsiloxane comprising units of the formula $R_2SiO$, wherein R is a monovalent hydrocarbon group, and containing at least one halogen group bonded directly to at least one silicon atom of the polydihydrocarbonsiloxane, (b) a polyoxyalkylene alcohol, and (c) a solvent selected from the group consisting of alkyl halides and alkenyl halides having boiling points at atmospheric pressure of from about 25° C. to about 130° C., in order to effect the reaction of (a) and (b) in (c) to prepare the block copolymers. In a further aspect of the invention, the reaction mixture may also contain: (d) a catalyst selected from the group consisting of sulfamic acid and pyridinium bisulfate. The resulting block copolymers are useful in the production of cellular polyurethanes.

14 Claims, No Drawings

PREPARATION OF HYDROLYZABLE POLYSILOXANE-POLYOXYALKYLENE BLOCK COPOLYMERS

BACKGROUND AND DESCRIPTION OF THE PRIOR ART

Hydrolyzable polysiloxane-polyoxyalkylene block copolymers, namely those copolymers wherein the polysiloxane and polyoxyalkylene blocks are linked by hydrolytically unstable silicon-oxygen-carbon bonds, have found wide acceptance as foam stabilizers in the production of polyurethane foam. They are produced, inter alia, by the reaction of a polyoxyalkylene alcohol with a polysiloxane containing a halogen atom directly attached to a silicon atom of the polysiloxane, as shown by the following skeletal equation:

$$\equiv SiCl + HOC\equiv \rightleftarrows \equiv SiOC\equiv + HCl$$

Typically, the reaction is carried out by mixing the halopolysiloxane with the polyoxyalkylene alcohol in the presence of a solvent such as toluene and in the absence of a catalyst. Since the reaction produces by-product hydrogen halide (e.g., hydrogen chloride) that is in equilibrium with the desired product and the reactants, a means must be provided for driving the reaction to completion. One method of driving the reaction to completion encompasses the neutralization of the hydrogen halide with a base. By way of illustration, U.S. Pat. No. 3,115,512 discloses the neutralization with a base of the hydrogen halide by-product of the reaction of halopolysiloxanylsulfates with organic hydroxyl-containing compounds (including polyoxyalkylene alcohols) in the process of producing "silicic acid esters" (including polysiloxane-polyoxyalkylene block copolymers). Suitable bases disclosed in that patent include metal hydroxides and their alkoxy derivatives such as sodium methylate, ammonia, amines and pyridines. As a further illustration, U.S. Pat. No. 3,532,732 discloses the neutralization with ammonia of the hydrogen chloride by-product of the reaction of chloropolysiloxanylsulfates with polyoxyalkylene derivatives in the presence of a toluene solvent in the process of producing polysiloxane-polyoxyalkylene block copolymers. The processes disclosed in the above-mentioned patents involve the formation of a halide salt by-product. Separation of this salt from the block copolymer product is difficult, time consuming and expensive.

OBJECTS

It is an object of the present invention to provide a process for the production of polysiloxane-polyoxyalkylene block copolymers by the reaction of a halopolysiloxane with a polyoxyalkylene alcohol which does not involve the formation of any appreciable amount of halide salt by-product, thereby facilitating product recovery.

It is another object of the present invention to provide a process for the production of polysiloxanepolyoxyalkylene block copolymers having an improved reaction time.

These and other objects of this invention will become apparent from a reading of the following detailed specification.

SUMMARY OF THE INVENTION

The present invention relates, in part, to a process for producing a hydrolyzable polysiloxane-polyoxyalkylene block copolymer which comprises refluxing a reaction mixture containing:

(a) a polydihydrocarbonsiloxane comprising units of the formula $R_2SiO$, wherein R is a monovalent hydrocarbon group, and containing at least one halogen group bonded directly to at least one silicon atom of the polydihydrocarbonsiloxane, (b) a polyoxyalkylene alcohol of the formula:

$$HO(C_nH_{2n}O)_vY \qquad (I)$$

wherein n has a value of 2 or 3, v is an integer of from about 5 to about 200, and Y is a terminal group selected from the class consisting of hydrogen, alkyl, alkenyl, aryl, and aralkyl radicals, and (c) a solvent selected from the group consisting of alkyl halides and alkenyl halides having boiling points at atmospheric pressure of from about 25° C. to about 130° C., in order to effect the reaction of (a) and (b) in (c) to produce the hydrolyzable polysiloxane-polyoxyalkylene block copolymer.

In a further aspect of the present invention, the reaction mixture also contains:

(d) a catalyst selected from the group consisting of sulfamic acid and pyridinium bisulfate.

Hydrolyzable polysiloxane-polyoxyalkylene block copolymers, such as those produced in accordance with the present invention, are useful in the production of cellular polyurethanes.

DESCRIPTION OF THE PREFERRED EMBODIMENTS

The polydihydrocarbonsiloxanes useful in producing polysiloxane-polyoxyalkylene block copolymers according to the process of the present invention are halogen-containing polydihydrocarbonsiloxanes characterized in (a) above. Useful monovalent hydrocarbon groups represented by R include methyl, ethyl, propyl, butyl, isopropyl, isobutyl and cyclohexyl. The polydihydrocarbonsiloxanes can also contain other groups bonded to silicon atoms of the polymer. Such other groups would include, for example, cyano- and halo-containing groups such as, for example, cyanoalkyl (e.g., cyanopropyl) and haloalkyl (e.g., chloropropyl, bromopropyl) groups. Such other groups would also include, for example, functional groups such as, for example, sulfolanyloxyalkyl-containing groups and morpholino-containing groups such as those identified as $E^2$ and $E^3$, respectively, in U.S. Pat. No. 4,043,951, incorporated herein by reference. The preferred polydihydrocarbonsiloxanes are those comprising units of the formula:

$$(RSiO_{1.5})_a(R_2SiO)_b(RXSiO)_c(XR_2SiO_{0.5})_d(R_3SiO_{0.5})_e \qquad (II)$$

wherein a ranges from 0 to about 10 mole percent, b ranges from about 50 to about 95 mole percent, c ranges from 0 to about 25 mole percent, d ranges from 0 to about 50 mole percent, and e ranges from 0 to about 25 mole percent, based upon said polydihydrocarbonsiloxanes, with the proviso that $c+d \geq 5$ mole percent; R is a monovalent hydrocarbon group free of aliphatic carbon to carbon multiple bonds; and X is halogen. The more preferred polydihydrocarbonsiloxanes are chlorine-containing polydihydrocarbonsiloxanes. The most preferred polydihydrocarbonsiloxanes are polydimethylsiloxanes comprising units of the formula:

$$(MeSiO_{1.5})_a(Me_2SiO)_b(ClMe_2SiO_{0.5})_f \qquad (III)$$

wherein a and b are defined in (II) above and wherein f ranges from 5 to about 50 mole percent based upon said polydimethylsiloxanes and wherein "Me" denotes methyl.

The polyoxyalkylene alcohols useful in producing polysiloxane-polyoxyalkylene block copolymers according to the process of the present invention are characterized by (I) above. Useful terminal groups represented by Y in (I) include, for example, methyl, ethyl, propyl, butyl, vinyl, phenyl, and phenylethyl. The polyoxyalkylene alcohols encompassed by the above formula include polyoxyethylene, polyoxypropylene and poly(oxypropylene-oxyethylene) alcohols, including mixtures thereof. The preferred alcohols are poly(oxypropylene-oxyethylene) alcohols.

The relative amount of the polyoxyalkylene alcohol and polydihydrocarbonsiloxane reactants employed to produce block copolymers according to the process of this invention is not narrowly critical and can be varied over a wide range depending upon the specific reactants employed. Generally, the molar ratio of polyoxyalkylene alcohol to polydihydrocarbonsiloxane is between about 9:0.8 and 0.8:9 (preferably 1.2:0.8 and 0.8:1.2).

The solvent useful in the process of the present invention is selected from the groups consisting of alkyl halides and alkenyl halides having a boiling point at atmospheric pressure of from about 25° C. to about 130° C. Examples of useful alkenyl halides are 1-chloropropene, 2-chloropropene, allyl chloride, 1-bromopropene, 2-bromopropene, allyl bromide, 1,2-dichloropropene, 2,3-dichloropropene, 3-chloro-2-methylpropene and allyl iodide. Examples of useful alkyl halides are ethyl bromide, 1-bromo-2-chloroethane, 1,1-dichloroethane, 1,2-dichloroethane, 1,1-dibromoethane, 2-bromo-1-chloropropane, 1-chloropropane, 2-chloropropane, 2-bromopropane, 1-bromo-2-chloropropane, 2-chloro-2-methylbutane, 1-chlorobutane, 1-chloropentane, 1-fluoropentane and 1,1,2-trichloro-1,2,2-trifluoroethane. The preferred solvents are the alkyl and alkenyl chlorides. The most preferred solvents are allyl chloride, 3-chloro-2-methylpropene and 1,1,2-trichloro-1,2,2-trifluoroethane.

A catalyst selected from the group consisting of sulfamic acid and pyridinium bisulfate is optionally employed in the process of the present invention. The catalyst is employed in a catalytically effective amount. Preferably, the catalyst is employed in an amount of from about 0.01 to about 1.0 parts by weight per 100 parts by weight of polydihydrocarbonsiloxane and polyoxyalkylene alcohol. The mechanism whereby the above-specified catalysts accelerate the reaction according to the process of the instant invention is unknown. Other acids and salts, namely phosphoric acid, sulfuric acid and sodium dihydrogen phosphate, were found to be ineffective in catalyzing the reaction according to the process of the invention.

The process of the invention is carried out by a reaction that involves refluxing the polyoxyalkylene alcohol and polydihydrocarbonsiloxane in the presence of a solvent at an elevated temperature (preferably from about 100° to about 130° C.). Atmospheric pressure is generally employed, although sub- or super-atmospheric pressure may be employed if desired for some purpose. Reaction time is generally less than about 10 hours, and the preferred reaction time is less than about 5 hours. Neutralization of any hydrogen chloride present in the product mixture and any acid catalyst, if employed, can be effected using any suitable neutralization agent such as, for example, sodium bicarbonate or pyridine. Byproduct salt formed by this neutralization can be separated from the product by filtration of the product mixture. The process of the invention can be carried out using either a batch or a semi-batch operation.

The term "block copolymer" is used herein to denote a material wherein at least one section ("block") of the molecule is composed of recurring monomeric units of one type and at least one other section ("block") of the molecule composed of recurring monomeric units of a different type. The different sections or blocks in the molecule can be arranged in any configuration (e.g., AB, ABA, branched or cyclic). Thus the term "block copolymers" as used herein includes graft copolymers. The block copolymers used in this invention can be discrete chemical compounds. Usually, however, the block copolymers are mixtures of various discrete block copolymeric species. The block copolymers are usually mixtures due, at least in part, to the fact that the siloxane and polyoxyalkylene alcohol reactants used to produce the block copolymers are themselves usually mixtures.

The hydrolyzable polysiloxane-polyoxyalkylene block copolymers produced in accordance with the present invention are useful as surfactants in the production of cellular polyurethanes.

The following Examples illustrate, but in no way limit, the present invention.

EXPERIMENTAL

The following experimental description illustrates the present invention. The following abbreviations are used herein.

| Abbreviation | Meaning |
|---|---|
| g. | grams |
| wt. | weight |
| cc. | cubic centimeters |
| ml. | milliliters |
| parts | parts by weight |
| percent | weight percent |
| Me | methyl |
| rise | The foam rise of cured polyurethane foam in inches. |
| cells per linear inch | This denotes the number of cells in a polyurethane foam per linear inch of the foam. The greater the cells per linear inch value, the finer the cell structure. |
| Polyol I | A polyol produced from glycerol and a mixture of 86 weight percent propylene oxide and 14 weight percent ethylene oxide. Polyol I has a hydroxyl number of 46. |
| TDI | A mixture of 80 weight percent 2,4-toluene diisocyanate and 20 weight percent 2,6-toluene diisocyanate. |

Polyurethane Foam Formulation and Preparation

Inasmuch as polysiloxane-polyoxyalkylene block copolymers have utility, inter alia, as foam stabilizers (i.e., surfactants), the block copolymers produced in accordance with the process of the invention in the Examples below were introduced into a polyether polyurethane foam formulation, and the "rise" and "cells per linear inch" of the resulting foams were measured. The foam formulation and procedure for foam preparation are given below.

| foam Formulation I | |
|---|---|
| Material | Parts By Weight |
| Polyol I | 100.0 |
| Distilled Water | 4.85 |
| Dimethylethanol amine | 0.35 |
| $CCl_3F$ | 15.0 |
| Stannous octoate | 0.3 |
| TDI | 56.9 |
| Polysiloxane-polyoxyalkylene block copolymer | Varied |

The foams were produced by adding the polysiloxane-polyoxyalkylene block copolymer to Polyol I in a 1000 ml. container, mixing with a spatula, adding a mixture of the water and amine to the container, adding $CCl_3F$ to the container, mixing with a drill press for 15 seconds, adding the stannous octoate, mixing for 8 seconds with a drill press, adding the TDI, mixing with a drill press for 7 seconds, pouring into a mold and curing for 15 minutes at 135° C. Prior to the cure, the temperature of the materials was maintained at no higher than 25° C.

EXAMPLE 1

This example demonstrates the effectiveness of allyl chloride as a solvent in a polyether alcohol/polydimethylsiloxane esterification reaction.

The following reactants were charged to a 0.5 liter, 3-necked flask: 165 grams of a mixture of poly(oxypropylene-oxyethylene) alcohols consisting of 35 wt. percent of an alcohol of the average formula $HO(C_3H_6O)_9(C_2H_4O)_{12}C_4H_9$, 45 wt. percent of an alcohol of the average formula $HO(C_3H_6O)_{28}(C_2H_4O)_{37}C_4H_9$, and 20 wt. percent of an alcohol of the average formula $HO(C_3H_6O)_{32}(C_2H_6O)_{42}C_4H_9$; 30.6 grams of a polydimethylsiloxane having the average formula $(MeSiO_{1.5})_{0.5}(Me_2SiO)_{12.1}(Me_2Si(Cl)O_{0.5})_{2.5}$; and 24 ml. of allyl chloride. The flask was fitted with an agitator, sparge tube, thermometer and condenser. The reaction mixture, which contained 1.23 percent base titratable chloride ion, was heated to reflux and held for 1.5 hours at between 92° and 109° C. After this time, the base titratable chloride ion of the resulting mixture was 0.12 percent. The mixture was refluxed for an additional 0.3 hours at 109° C. Four grams of sodium bicarbonate were then added to the mixture in order to neutralize the excess acid, and the allyl chloride was stripped overhead. After being filtered, the product was a clear liquid having a viscosity of 1020 centistokes at 25° C. When this product was employed in an amount of 0.8 parts by weight per 100 parts by weight of Polyol I in Foam Formulation I, the resulting foam had a rise of 11.3 inches and a number of cells per linear inch of 28.

EXAMPLE 2

This is another example demonstrating the effectiveness of allyl chloride as a solvent in a polyether alcohol/polydimethylsiloxane esterification reaction.

The following reactants were charged to a 1-liter, 3-necked flask: 495 grams of a mixture of poly(oxypropylene-oxyethylene) alcohols consisting of 35 wt. percent of an alcohol of the average formula $HO(C_3H_6O)_9(C_2H_4O)_{12}C_4H_9$, 45 wt. percent of an alcohol of the average formula $HO(C_3H_6O)_{28}(C_2H_4O)_{37}C_4H_9$, and 20 wt. percent of an alcohol of the average formula $HO(C_3H_6O)_{32}(C_2H_6O)_{42}C_4H_9$; 90.6 grams of a polydimethylsiloxane having the average formula $(MeSiO_{1.5})_{15}(Me_2SiO)_{12.1}(Me_2Si(Cl)O_{0.5})_{2.5}$; and 52.2 grams of allyl chloride. The flask was fitted with an agitator, sparge tube, thermometer, and condenser. The reaction mixture was heated to reflux and held for 2.5 hours at between 104° and 117° C. About 12 grams of sodium bicarbonate were added to the mixture in order to neutralize the excess acid, and the allyl chloride was stripped overhead. After being filtered, the product from the flask was a clear liquid having a viscosity of 1035 centistokes at 25° C. When this product was employed in an amount of 0.8 parts by weight per 100 parts by weight of Polyol I in Foam Formulation I, the resulting foam had a rise of 11.7 inches and a number of cells per linear inch of 26.

EXAMPLE 3

This example demonstrates the effectiveness of 3-chloro-2-methyl propene as a solvent in a polyether alcohol/polydimethylsiloxane esterification reaction.

The following reactants were charged to a 0.5 liter, 3-necked flask; 165 grams of a mixture of poly(oxypropylene-oxyethylene) alcohols consisting of 35 wt. percent of an alcohol of the average formula $HO(C_3H_6O)_9(C_2H_4O)_{12}C_4H_9$, 45 wt percent of an alcohol of the average formula $HO(C_3H_6O)_{28}(C_2H_4O)_{37}C_4H_9$, and 20 wt. percent of an alcohol of the average formula $HO(C_3H_6O)_{32}(C_2H_6O)_{42}C_4H_9$; 30.6 grams of a polydimethylsiloxane having the average formula $(MeSiO_{1.5})_{0.5}(Me_2SiO)_{12.1}(Me_2Si(Cl)O_{0.5})_{2.5}$; and 25 grams of 3-chloro-2-methyl propene. The flask was fitted with an agitator, sparge tube, thermometer and condenser. The reaction mixture, which contained 1.23 percent base titratable chloride ion, was heated to reflux and held for 1.1 hours at between 122° and 124° C. After reaction, the base titratable chloride ion of the resulting mixture was 0.10 percent. Four grams of sodium bicarbonate were added in order to neutralize the excess acid, and the 3-chloro-2-methyl propene was stripped overhead. After being filtered, the product from the flask was a clear liquid having a viscosity of 1040 centistokes at 25° C. When this product was employed in an amount of 0.8 parts by weight per 100 parts by weight of Polyol I in Foam Formulation I, the resulting foam had a rise of 11.7 inches and a number of cells per linear inch of 30.

EXAMPLE 4

This example demonstrates the effectiveness of 1,1,2-trichloro-1,2,2-trifluoroethane as a solvent in a polyether alcohol/polydimethylsiloxane esterification reaction.

The following reactants were charged to a 0.5 liter, 3-necked flask: 165 grams of a mixture of poly(oxypropylene-oxyethylene) alcohols consisting of 35 wt. percent of an alcohol of the average formula $HO(C_3H_6O)_9(C_2H_4O)_{12}C_4H_9$, 45 wt. percent of an alcohol of the average formula $HO(C_3H_6O)_{28}(C_2H_4O)_{37}C_4H_9$, and 20 wt. percent of an alcohol of the average formula $HO(C_3H_6O)_{32}(C_2H_6O)_{42}C_4H_9$; 39.3 grams of a polydimethylsiloxane having the average formula $(MeSiO_{1.5})_{1.2}(Me_2SiO)_{10.2}(Me_2Si(Cl)O_{0.5})_{3.2}$; and 25 grams of 1,1,2-trichloro-1,2,2-trifluoroethane. The flask was fitted with an agitator, sparge tube, thermometer and condenser. The reaction mixture, which contained 1.3 percent base titratable chloride was heated to reflux at between 120° and 123° C. and held 3.5 hours. After reaction, the base titratable chloride of the resulting mixture was 0.21 percent. Two cc. of pyridine were added in order to neutralize the excess acid in the mixture, and the 1,1,2-trichloro-1,2,2-trifluoroethane was stripped overhead. After being filtered, the product from the flask was a clear liquid having a viscosity of 1360 centistokes at 25° C. When this product was employed in an amount of 0.7 parts by weight per 100 parts by weight of Polyol I in Foam Formulation I, the resulting foam had a rise of 12.2 inches and a number of cells per linear inch of 32.

EXAMPLE 5

This example demonstrates the effectiveness of pyridinium bisulfate as a catalyst in a polyether alcohol/polydimethylsiloxane esterification reaction.

The following reactants were charged to a 0.5 liter, 3-necked flask: 158 grams of a mixture of poly(oxypropylene-oxyethylene) alcohols consisting of 35 wt. percent of an alcohol of the average formula $HO(C_3H_6O)_9(C_2H_4O)_{12}C_4H_9$, 45 wt. percent of an alcohol of the average formula $HO(C_3H_6O)_{32}(C_2H_6O)_{42}C_4H_9$, and 20 wt. percent of an alcohol of the average formula $HO(C_3H_6O)_{32}(C_2H_6O)_{42}C_4H_9$; 38 grams of a polydimethylsiloxane having the average formula $(MeSiO_{1.5})_{1.2}(Me_2SiO)_{10.2}(Me_2SiClO_{0.5})_{3.2}$; 22 grams of 1,1,2-trichloro-1,2,2-trifluoroethane; and 0.2 grams of pyridinium bisulfate. The flask was fitted with an agitator, sparge tube, thermometer and condenser. The reaction mixture was heated to reflux at about 125° C. and held for 1.5 hours. After reaction, the base titratable chloride ion of the resulting mixture was 0.1 percent. About 4 grams of sodium bicarbonate were added and the 1,1,2-trichloro-1,2,2-trifluoroethane was stripped overhead. After being filtered, the product from the flask was a clear liquid having a viscosity of 1250 centistokes at 25° C. When this product was employed in an amount of 0.6 parts by weight per 100 parts by weight of Polyol I in Foam Formulation I, the resulting foam had a rise of 11.8 inches and a number of cells per linear inch of 30.

EXAMPLE 6

This example demonstrates the effectiveness of sulfamic acid as a catalyst in a polyether alcohol/polydimethylsiloxane esterification reaction.

The following reactants were charged to a 0.5 liter, 3-necked flask: 158 grams of a mixture of poly(oxypropylene-ethylene) alcohols consisting of 35 wt. percent of an alcohol of the average formula $HO(C_3H_6O)_9(C_2H_4O)_{12}C_4H_9$, 45 wt. percent of an alcohol of the average formula $HO(C_3H_6O)_{28}(C_2H_4O)_{37}C_4H_9$, and 20 wt. percent of an alcohol of the average formula $HO(C_3H_6O)_{32}(C_2H_6O)_{42}C_4H_9$; 38 grams of a polydimethylsiloxane having the average formula $(MeSiO_{1.5})_{1.2}(Me_2SiO)_{10.2}(Me_2Si(Cl)O_{0.5})_{3.2}$; 22 grams of 1,1,2-trichloro-1,2,2-trifluoroethane and 0.2 grams of sulfamic acid. The flask was fitted with an agitator, sparge tube, thermometer and condenser. The reaction mixture was heated to reflux at about 125° C. and held 2 hours. After reaction, the base titratable chloride ion of the resulting mixture was 0.09 percent. About 4 grams of sodium bicarbonate were added and the 1,1,2-trichloro-1,2,2-trifluoroethane was stripped overhead. After being filtered, the product from the flask was a clear liquid having a viscosity of 1670 centistokes at 25° C. When this product was employed in an amount of 0.6 parts by weight per 100 parts by weight of Polyol I in Foam Formulation I, the resulting foam had a rise of 11.2 inches and a number of cells per linear inch of 30.

COMPARISON A

This is a comparative example showing the ineffectiveness of a nitrogen sparge in driving the polydimethylsiloxane/polyoxyalkylene alcohol esterification reaction to completion.

The following reactants were charged to a 0.5 liter, 3-necked flask: 150 grams of a mixture of poly(oxypropylene-oxyethylene) alcohols consisting of 78 wt. percent of an alcohol of the average formula $HO(C_3H_6O)_{15}(C_2H_4O)_{20}C_4H_9$, and 22 wt. percent of an alcohol of the average formula $HO(C_3H_6O)_{28}(C_2H_4O)_{37}C_4H_9$; and, 31.3 grams of a polydimethylsiloxane having the average formula $(Me_2SiO)_{88}(Me_2Si(Cl)O_{0.5})_2$. The flask was fitted with an agitator, sparge tube, thermometer and distillation head. The reaction mixture, which contained 1.34 percent base titratable chloride ion, was refluxed at between 135° and 140° C. for 3.5 hours while being sparged with nitrogen. The resulting product was a heterogeneous mixture containing 0.34 percent base titratable chloride.

It is to be noted that the percent base titratable chloride ion (0.34 percent) in the product mixture is considerably higher than the amount found in the product mixtures of Examples 1 and 3 to 6 (ranging from 0.09 to 0.21 percent).

COMPARISON B

This is a comparative example showing the ineffectiveness of reduced pressure in driving the polymethylsiloxane/polyoxyalkylene alcohol esterification reaction to completion.

The following reactants were charged to a 0.5 liter, 3-necked flask: 110 grams of a mixture of poly(oxyalkylene-oxyethylene) alcohols consisting of 35 wt. percent of an alcohol of the average formula $HO(C_3H_6O)_{28}(C_2H_4O)_{37}C_4H_9$, and 25 wt. percent of an alcohol of the average formula $HO(C_3H_6O)_{32}(C_2H_6O)_{43}C_4H_9$; 25 grams of a polydimethylsiloxane having the average formula $(MeSiO_{1.5})_{0.4}(Me_2SiO)_{5.3}(Me_2Si(Cl)O_{0.5})_{2.4}$; and 20 grams of toluene. The flask was fitted with an agitator, sparge tube, thermometer and condenser attached to a vacuum pump. The reaction mixture ws refluxed at between 100° and 130° C. and 10–15 mm Hg absolute pressure for 5 hours. The resulting product was a heterogeneous mixture.

COMPARISON C

This is a comparative example showing the ineffectiveness of toluene in driving the polydimethylsiloxane/polyoxyalkylene alcohol esterification reaction to completion.

The following reactants were charged to a 0.5 liter, 3-necked flask: 165 grams of a mixture of poly(oxypropylene-oxyethylene) alcohols consisting of 35 wt. percent of an alcohol of the average formula $HO(C_3H_6O)_9(C_2H_4O)_{12}C_4H_9$, and 45 wt. percent of an alcohol of the average formula $HO(C_3H_6O)_{32}(C_2H_6O)_{43}C_4H_9$; 30 grams of a polydimethylsiloxane having the average formula $(MeSiO_{1.5})_{3.2}(Me_2SiO)_{22}(Me_2Si(Cl)O_{0.5})_{5.2}$; and 48 grams of toluene. The flask was fitted with an agitator, sparge tube, thermometer and condenser. The reaction mixture, which contained 1.12 percent base titratable chloride ion, was heated to a reflux temperature of 138° C. and held at that temperature for 3 hours. The resulting product was a heterogeneous mixture containing 0.72 percent base titratable chloride ion.

It is to be noted that the percent base titratable chloride ion (0.72 percent) in the product mixture is considerably less than the amount found in the product mixtures of Examples 1 and 3 to 6 (ranging from 0.09 to 0.21 percent).

COMPARISON D

This is a comparative example showing the prior art practice of using a toluene solvent together with an ammonia sparge in order to drive the polydimethylsiloxane/polyoxyalkylene alcohol esterification to completion.

The following reactants were charged to a 1.0 liter, 3-necked flask: 220 grams of a mixture of poly(oxypropylene-oxyethylene) alcohols consisting of 35 wt. percent of an alcohol of the average formula $HO(C_3H_6O)_9(C_2H_4O)_{12}C_4H_9$, 40 wt. percent of an alochol of the average formula $HO(C_3H_6O)_{28}(C_2H_4O)_{37}C_4H_9$, and 25 wt. percent of an alcohol of the average formula $HO(C_3H_6O)_{32}(C_2H_6O)_{42}C_4H_9$; 47.5 grams of a polydimethylsiloxane having the average formula $(MeSiO_{1.5})_{0.4}(Me_2SiO)_{5.3}(Me_2Si(Cl)O_{0.5})_{2.4}$; and 115 grams of toluene. The flask was fitted with an agitator, sparge tube, thermometer and condenser. The reaction mixture was heated to 100° C. and sparged for 0.5 hours with ammonia. The resulting mixture was filtered and recharged to the flask. About 5 grams of NaHCO$_3$ was added to neutralize the excess acid, and the toluene was stripped overhead. The mixture was again filtered. The product filtrate was a clear liquid having a viscosity of 1150 contistokes at 25° C. When this product was employed in an amount of 0.9 parts by weight per 100 parts by weight of Polyol I in Foam Formulation I, the resulting foam had a rise of 11.2 inches and a number of cells per linear inch of 32.

What is claimed is:

1. A process for producing a hydrolyzable polysiloxane-polyoxyalkylene block copolymer which comprises refluxing a reaction mixture containing:
   (a) a polydihydrocarbonsiloxane comprising units of the formula $R_2SiO$, wherein R is a monovalent hydrocarbon group, and containing at least one halogen group bonded directly to at least one silicon atom of the polydihydrocarbonsiloxane,
   (b) a polyoxyalkylene alcohol of the formula:

$HO(C_nH_{2n}O)_vY$ wherein
   n has a value of 2 or 3, v is an integer of from about 5 to about 200, and
   Y is a terminal group selected from the class cnsisting of alkyl, alkenyl, aryl and aralkyl radicals, and
   (c) a solvent selected form the group consisting of alkyl halides and alkenyl halides having boiling points at atmospheric pressure of from about 25° C. to about 130° C.

2. The process of claim 1 wherein the halogen is chlorine.

3. The process of claim 1 wherein the polyoxyalkylene alcohol is a poly(oxypropylene-oxyethylene) alcohol.

4. The process of claim 1 wherein the solvent is alkyl halide.

5. The process of claim 4 wherein the alkyl halide is 1,1,2-trichloro-1,2,2-trifluoroethane.

6. The process of claim 1 wherein the solvent is an alkenyl halide.

7. The process of claim 6 wherein the alkenyl halide is allyl chloride.

8. The process of claim 6 wherein the alkenyl halide is 3-chloro-2-methylpropene.

9. The process of claim 1 wherein the reaction mixture also contains:
   (d) a catalyst selected from the group consisting of sulfamic acid and pyridinium bisulfate in a catalytically effective amount.

10. The process of claim 9 wherein the catalyst is sulfamic acid.

11. The process of claim 9 wherein the catalyst is pyridinium bisulfate.

12. A process for producing a hydrolyzable polysiloxane-polyoxyalkylene block copolymer which comprises refluxing a reaction mixture containing:
    (a) a polydihydrocarbonsiloxane comprising units of the formula:

$(RSiO_{1.5})_a(R_2SiO)_b(RXSiO)_c(XR_2SiO_{0.5})_d(R_3SiO_{0.5})_e$ wherein a ranges from 0 to about 10 mole percent, b ranges from about 50 to about 95 mole percent, c ranges from 0 to about 25 mole percent, d ranges from 0 to about 50 mole percent, and e ranges from 0 to about 25 mole percent, based upon said polydihydrocarbonsiloxane, with the proviso that $c+d \geq 5$ mole percent; R is a monovalent hydrocarbon group free of aliphatic carbon to carbon multiple bonds; and X is halogen,
    (b) a polyoxyalkylene alcohol of the formula:

$HO(C_nH_{2n}O)_vY$ wherein n has a value of 2 or 3, v is an integer of from about 5 to about 200, and Y is a terminal group selected from the class consisting of alkyl, alkenyl, aryl and aralkyl radicals, and
    (c) a solvent selected from the group consisting of alkyl halides and alkenyl halides having boiling points at atmospheric pressure of from about 25° C. to about 130° C.

13. The process of claim 12 wherein X is chlorine.

14. A process for producing a hydrolyzable polysiloxane-polyoxyalkylene block copolymer which comprises refluxing a reaction mixture containing:
    (a) a polydimethylsiloxane comprising units of the formula:

$(MeSiO_{1.5})_a(Me_2SiO)_b(ClMe_2SiO_{0.5})_f$ wherein a ranges from 0 to about 10 mole percent, b ranges from about 50 to about 95 mole percent, and f ranges from 5 to about 50 mole percent based upon said polydimethylsiloxane,
    (b) a polyoxyalkylene alcohol of the formula:

$HO(C_nH_{2n}O)_vY$ wherein n has a value of 2 or 3, v is an integer of from about 5 to about 200, and Y is a terminal group selected from the class consisting of alkyl, alkenyl, aryl and aralkyl radcicals, and
    (c) a solvent selected from the group consisting of alkyl halides and alkenyl halides having boiling points at atmospheric pressure of from about 25° C. to about 130° C.

* * * * *